Nov. 12, 1968  G. R. KILP ET AL  3,409,973
PROCESS FOR PRODUCING ANNULAR COMPOSITE MEMBERS
Filed Jan. 19, 1965

WITNESSES:
Bernard R. Giegner
Raymond H. Majisko

INVENTORS
Gerald R. Kilp, Paul M. Bergstrom,
and Harry M. Ferrari.
BY
Frederick Shapoe
ATTORNEY

United States Patent Office 3,409,973
Patented Nov. 12, 1968

3,409,973
PROCESS FOR PRODUCING ANNULAR
COMPOSITE MEMBERS
Gerald R. Kilp, Bethel Park, Paul M. Bergstrom, Irwin, and Harry M. Ferrari, Pittsburgh, Pa., assignors to Westinghouse Electric Corporation, Pittsburgh, Pa., a corporation of Pennsylvania
Continuation-in-part of application Ser. No. 120,066, June 27, 1961. This application Jan. 19, 1965, Ser. No. 438,450
8 Claims. (Cl. 29—420)

This patent application is a continuation-in-part of the copending application Ser. No. 120,066, filed on June 27, 1961, and now abandoned.

The present invention relates to a composite, elongated annular cylindrical unit comprising a hollow metallic outer sheath, a hollow inner metallic sheath and a dense highly compacted solid disposed and enclosed therein, and a process for producing the same.

There is a need for elongated annular composite members comprising a hollow outer sheath or jacket of a metal and a hollow inner sheath joined to an enclosed body of a highly compacted solid which latter may be a ceramic, a semiconductor material, a nuclear fuel or the like.

For example, in producing thermoelectric devices, one of the most difficult problems is the application of good electrical contacts to a body of the thermoelectric material proper. The most efficient thermoelectric materials for both cooling and power generation applications are almost always comprised of semiconductor or ceramic-like materials. It is critically necessary that the electrical contacts which are metallic, be joined or bonded to the thermoelectric material almost perfectly so that the lowest possible electrical drop occurs therebetween. Also, the contact member must be so mechanically or physically joined that it will not loosen or become detached during service conditions when substantial temperature differences prevail in the devices.

Those skilled in the art will appreciate the extreme difficulties in soldering, brazing or otherwise joining a metallic contact to a semiconductor or ceramic material, the latter often being brittle, to obtain these desired objectives. A high percentage of defective or unsatisfactory devices occur routinely even with the best processes now in use.

During service many failures take place because of the gradual weakening or mechanical disruption of the bond between the metallic contacts and the body of thermoelectric material, whereby electrical continuity is disrupted, and more importantly, the thermal conductivity will be seriously reduced.

The object of the present invention is to provide an annular composite unit comprising a hollow inner cylindrical metal member and a hollow outer concentric cylindrical metal member disposed thereabout with a compactible material disposed in the space therebetween, the material being highly consolidated to a dense mass and in firm and intimate contact with the walls of the metal members.

Another object of the present invention is to provide an annular composite unit comprising a hollow inner cylindrical metal member and a hollow outer concentric cylindrical metal member disposed thereabout, both metal members having optimum compressive residual stresses and a preferred grain orientation, with a compactible material disposed in the space therebetween, the material being highly consolidated into a dense mass and in firm and intimate contact with the walls of the metal members.

Another object of the present invention is to provide a process for concurrently consolidating a compactible nonmetallic thermoelectric material into a thermoelectric body and to provide well bonded metal contacts thereto by simultaneously tube reducing a hollow outer metal jacket, a hollow inner metal jacket and the nonmetallic thermoelectric material so as to produce an annular elongated thermoelectric element in which the metal jackets form firm electrical contacts extremely well bonded to the highly consolidated body of thermoelectric material capable of meeting requirements for optimum thermoelectrical use.

A still further object of this invention is to provide a process for producing annular nuclear fuel elements having both inner and outer metallic jackets of desirable optimum physical properties and preferred grain orientation.

Other objects of the invention will, in part, be obvious and will, in part, appear hereinafter.

For a better understanding of the nature and scope of the invention, reference should be had to the following detailed description and drawings, in which.

Figure 1:
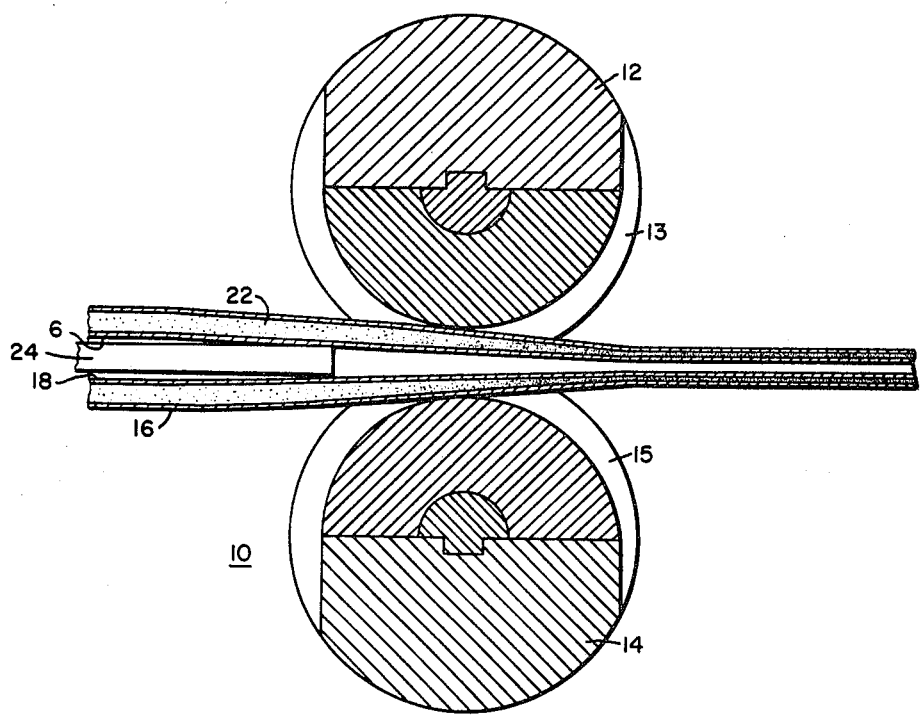
FIGURE 1 is an elevation view in cross section of an annular composite member being processed in accordance with the teachings of the invention.

In accordance with the present invention and in the attainment of the foregoing objects there is provided a process for producing an annular composite, elongated cylindrical unit. The process comprises the disposing of a compactible material between at least two concentric cylindrical metal members with the compactible material filling the annular space therebetween. This composite then is processed by a rocking roll tube reducing process to effect a substantial reduction to provide a dense, highly compacted, uniform body of material in firm and intimate contact with the walls of the metal members.

The preferred rocking roll tube reducing process employed by this invention comprises the use of the type of apparatus delineated on page 276 in the text "The Metallurgy of Zirconium" by Lustman and Keize and known as the "Rockrite" process which has been utilized in the making of seamless pipes. We have discovered unexpectedly that the rocking roll process is capable of producing the annular composite members having relatively unblemished surfaces on inner and outer metallic members as well as a product which has an outstanding uniform quality and better physical characteristics than is now attainable by any known prior art method. This adaptation of the "Rockrite" rocking roll process also is capable of cold compacting materials to a high density in annular form which previously could only be hot compacted to good density, such as the iron sold under the trade nume of "RZ-Fe." This preferred rocking roll tube reducing process is also capable of compacting into a dense annular form materials, such as tungsten powder, which are difficult to compact by any means, as an initial step prior to further working of the material.

This unique rocking roll tube reducing process for producing annular composite elements comprises applying a pair of cooperating rocking dies, having a roll working face configuration, about the periphery of an elongated annular composite member comprising two metal tubes and a compactible material therebetween. Inside the innermost hollow inner metallic tube is positioned a stationary mandrel. The plane of the rocking motion of the dies is parallel to the longitudinal direction of the elongated member. The dies comprise working forces of progressively reduced complementary groove sections. During the member reducing operation, the dies both turn on their axes and they thereby progressively draw the member through the groove sections while exerting a powerful radially directed compressing action. The dies rock back and forth, the member turning a small amount during each rocking cycle and the member advances a predetermined distance into the rocking rolls, thereby reducing the cross sectional area of a portion and concurrently increasing the length thereof. The annular composite member is progressively worked by a simultaneous reduction of the thickness of the hollow inner and outer metallic members while compacting the material in the annular space between the two metallic members with a high degree of uniformity and density.

This preferred rocking roll tube reducing process substantially differs from the process of swaging which has been employed in producing annular composite elements. The most common method of swaging employed is rotary or hammer swaging. Rotary swaging reduces the cross sectional area of a member by intermittent or continuous hammering of a hollow outside metallic member. Severe cold working results in this hollow outside metallic member necessitating stress relieving heat treatments after a moderate reduction to continually relieve the metal of the internal stresses which may split the member open. Before any substantial working of the inside hollow metallic member can be accomplished, the material in the annular space between the members must reach a "mandrel" density. The force accomplishing the reduction during hammer swaging is actually a sharp blow momentarily applied to a small external surface of the outside member which must be transmitted through the wall thickness of the member, then through the compactible material which is semifree to exert a flow pressure away from the point of maximum compression and thence to the hollow inner metallic member. This tends to push away the compactible material and less densification occurs. The outer tube surface bears the marks of these hammer blows and is otherwise rough and nonuniform in its properties.

Another method of forming an annular composite member is to swage the internal portion of the hollow inside member while restricting any radial movement on the part of the hollow outside member.

In both instances the only metallic member substantially cold worked is that member to which the forces are directly applied. To limit the intermediate stress relieving steps required to achieve the maximum reduction in cross section areas before stress relief is required, however, swaging often is performed on members at an elevated temperature.

An important advantage obtained by employing the rocking roll tube reducing process of this invention, is that the hollow metallic members can be easily and controllably reduced in wall thickness to practically any design requirement, while simultaneously compacting at least one material in the annular space between the tubular metallic members to a highly uniform material of a desired optimum density. By this process we can readily secure an annular composite member up to 75 feet in length and 24 inches in outside diameter, with any desired annular material disposed therein.

This preferred rocking roll tube reducing process accomplishes large reductions in the cross sectional area of annular composite members without requiring any intervening stress relief annealing operations. Cross sectional areas can be reduced by as much as 70% in one pass by this cold tube reducing process without stress relief anneal. Further reductions may be made employing two or more rocking roll tube reducing passes. Stress relieving of the metallic members between passes is not always required. In some cases heat treatment is only employed to achieve some optimum physical property for specific end product use.

During heat treatment to achieve an optimum physical property of the cladding material some sintering of the compactible material may occur. A partial sintering of the compactible material may be desirable and may be included as a separate process step between two or more rocking roll tube reducing operations. This partial sintering will increase the density of the compactible material. The temperature for partial sintering must be so selected that the cladding material is not adversely affected. Temperatures at which the compactible material will sinter will be applied so that the outer tube metal is stress relief annealed.

The employment of the rocking roll tube reducing process in manufacturing annular composite elements yields other very important benefits. Since this process is essentially a squeezing operation, the contact of the rolls on the metallic tubular member exerts forces pushing all the compactible material between the tubes from the least dense to the most dense area. The result is that a higher uniformity of density of the material is easily achieved during one tube reducing pass. Also both tubular metallic members are simultaneously and uniformly reduced whereby the walls of the metallic members are put in compression. Proper design of the tubes for the annular composite element has been found to lead to a preferred grain orientation in the metallic member. For example, zirconium tubes with a given grain texture when rocking roll treated will show a desired grain orientation not possible with hammer swaging. Desirable crystalline orientation in thermoelectric materials can also be achieved while compacting the same by the rocking roll process in the annular space between the metallic members.

The rocking roll tube reducing process is particularly suitable for compacting metals, semiconductors, ceramics, thermoelectric and nuclear materials within two nested tubes.

A preferred product of this invention is a thermoelectric element made in accordance with the teachings herein. The thermoelectric material, such for example as lead telluride or germanium telluride, is introduced as a powder by tamping or vibration within the annular space between two concentrically disposed metallic cylindrical members. The annular space at each end of the tubes is plugged to retain the thermoelectric material in place. The annular composite member is then rocking roll reduced to the final designed shape thereby cold working the metallic members to the reduced size while compacting the thermoelectric material to dense optimum design requirements. The resulting elongated annular composite member may then be heat treated, if required, to ensure good contact between the compacted thermoelectric material and the metallic members.

The elongated annular composite member after being processed may then be severed into a plurality of cylindrical units which may be further machined to desired dimensions and shape. The elongated annular composite member may also be severed into a plurality of individual annular or other shapes of thermoelectric pellets with metal contacts in place. These pellets, or cylindrical units, may then be joined to other thermoelectric pellets by interposing insulating connections to produce composite thermoelectric assemblies electrically connected in parallel or series. These composite thermoelectric elements and assemblies, when properly insulated both electrically and thermally, are then capable of functioning as thermoelectric power generators or as cooling devices.

Another desirable use for this invention is in the manufacture of annular nuclear fuel elements. The process for producing these reduced, high density annular nuclear fuel elements is basically the same as that indicated for the annular thermoelectric elements. The annular fuel elements made in this manner are superior in several ways to annular elements made by prior art techniques. The metallic members have a thinner wall since both of the members are in compression. A thinner metal wall is desirable in that less neutron absorption will occur. The weight ratio of active nuclear fuel to metallic member, or cladding, becomes more favorable because the weight per unit foot of the cladding is reduced. At the same time the overall weight of a complete nuclear element is reduced.

Another distinct advantage of the rocking roll process is the achievement of desired grain orientation in the cladding material, such as in zirconium. Zirconium and zirconium alloy, such as Zircaloy, clad nuclear elements can be produced with the majority of the basal lattice planes parallel to the central axis of the element. This capability allows the walls of the cladding to be reduced in thickness, conserving weight and material, without sacrificing structural reliability since this crystal orientation is retained in spite of the severe reductions employed.

When properly designed, nuclear fuel elements produced my the rocking roll tube reducing process comprise a fissionable fuel material which has been easily compacted into a highly dense uniform structure in intimate contact with the cladding throughout the entire structure. These fuel elements are not as susceptible to the occurrence of cladding separating away from the device compaction of fissionable material or the creation of "hot spots" within the element.

Suitable nuclear or fissionable fuel materials which may be compacted in the annular space between concentric metallic members made from stainless steel, zirconium, zirconium alloys, aluminum and aluminum alloys, are both arc-fused and ceramic type uranium dioxide, uranium nitride, uranium carbide and plutonium compounds and mixtures thereof, as well as metal powders and any of these for example, mixtures consisting of 70% by weight of stainless steel powder and 30% by weight of uranium dioxide, or a mixture of 50% by weight of each of stainless steel powder and uranium dioxide. Both ordinary and enriched fissionable material and fertile material, such as natural uranium, enriched uranium, plutonium and thorium as well as mixtures thereof, are capable of being compacted into annular fuel elements by the rocking roll reducing process.

It should be understood that the compactible material or materials may be either cast or molded within the hollow cylindrical metal member. They may also be disposed therein in the form of one or more prepressed compacts, or loosely as powder or flakes. In all cases, it is desirable that as high a density of the material as is reasonably possible be secured when it is introduced into the annular space between the metal members. Suitable means known to those skilled in the art, such as tamping and vibrating, may be employed to achieve reasonable densities for the compactible material prior to any initial tube reductions.

For some applications, such as for thermoelectric members, the unit should be evacuated to remove all gases from the material being compacted. For other applications such as melting electrodes, wherein an alloyed component is placed in the annular space, evacuation is not required, or at most a nonreactive gas such as argon or nitrogen may be passed through the assembly.

Referring to FIG. 1, there is shown schematically a portion of a rocking roll reducing apparatus 10 having two rolls 12 and 14 having ground surfaces, mounted on a reciprocating housing (not shown). In operation, an annular composite unit 16 comprising a hollow inner cylindrical metal member 18 and an outer cylindrical metal member 20 with a compactible material 22 disposed therebetween, is placed within complementary grooves 13 and 15 of progressively varying depth in rolls 12 and 14. A mandrel 24 is positioned in the hollow 26 of the member 18 through the back end thereof, the mandrel corresponding closely to the diameter of the hollow. In some cases the mandrel is tapered. The composite unit 16 is then reduced by introducing it into the complementary grooves 13 and 15 of the rolls 12 and 14 and by the rotary rocking motion of the rolls 12 and 14 in a plane parallel to the longitudinal direction of the unit 16. The unit 16 is reciprocated within the grooves 13 and 15 in the rolls 12 and 14 and advanced slightly at the end of each rocking cycle to progressively compact the unit 16 increment by increment. The unit 16 also is rotated between each back and forth compacting movement so as to produce uniform compaction. The apparatus 10 thereby progressively reduces the cross sectional area of the unit 16 as it passes progressively therethrough.

A reduction in cross sectional area of up to 70% has been obtained in a single stage by using the above-described apparatus and method.

Figure 2:
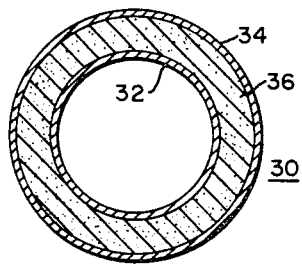
FIG. 2 is an elevation view in cross section of an annular composite member embodying the teachings of this invention.

Referring to FIG. 2, there is shown a section of a rocking roll tube reduced unit 30 consisting of an inner hollow cylindrical metal member 32 and an outer hollow cylindrical metal member 34. A dense, uniform, highly compacted body 36 of material is disposed in the annular space therebetween, said body 36 being joined in firm and intimate contact with the walls of the metal members 32 and 34.

Figure 3:
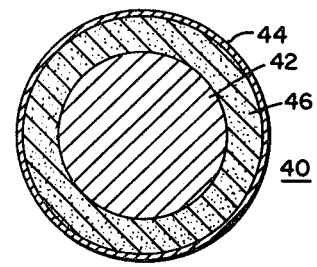
FIG. 3 is an elevation view in cross section of a composite member with a solid center embodying the teachings of this invention.

In some cases a solid composite rod of materials can be processed. Referring to FIG. 3, there is shown a finally reduced unit 40 comprising an inner cylindrical solid rod 42 and an outer hollow cylindrical metal member 44 with a body of dense highly compacted material 46 disposed therebetween and joined in firm and intimate contact with the walls of the metal rod 42 and metal member 44. In this modification, the solid rod 42 is not reduced as much as is member 44. Therefore only moderate reductions are secured.

The metals used in forming the inner and outer members of a given annular unit are selected on the basis of their compatibility with the desired compactible material and the use to which the tube reduced annular unit will be placed. For example, when a compactible thermoelectric material is employed, it is desirable to employ metal members selected from a group consisting of copper, aluminum, zirconium or iron, or base alloys thereof, for the inner and outer metal members, or sheaths. These metals provide good electrical contact portions for the thermoelectric material since they are relatively good electrically and thermally conductive materials.

A mixture of molybdenum and zirconium powders, or other powder mixtures may be compacted between copper, or other metallic cylinders. The cylinders may then be removed and the compacted body employed as such. In a similar manner the formation of heavy walled tungsten tubing may be made from tungsten powder by this process.

This rocking roll tube reducing process for manufacturing annular composite elongated members has other advantages over prior art methods. Ideally, ceramics, such as uranium dioxide, and intermetallic compounds, such as lead telluride and germanium telluride, should be readily compacted to high densities in continuous rod or tube shapes many feet in length. At the same time it is advantageous to have apparatus suitable for rapid changing of dies from relatively large outside and inside diameter measurements to relatively small outside and inside diameter measurements. Both of these desirable features are available with this apparatus.

Other advantageous uses of the rocking roll reducing process can be found in the manufacturing of preinsulated members for heat exchanger tubes, the producing of annular consumable electrodes, the compacting of powders into billets for further fabrication by extrusion, the fabrication of ceramic or high-temperature refractory metal tubes for muffler applications, the creation of carbide liners for cylinders and the initial step in the fabrication of tubular or other products from tungsten powders.

In producing preinsulated heat exchanger tubes, it is possible to effectively insulate a metal tube by compacting a layer of ceramic or high temperature refractory metal, such as magnesium oxide, by the rocking roll reducing process, between the tube proper and a thin metal cladding. When desirable, the cladding is removed after assuring the integrity of the insulating coating by a technique such as firing or sintering.

Annular consumable electrodes are desirable in some manufacturing processes. Moreover, the cladding of the annular consumable electrode can be specifically designed to become an alloying material in the melting process involved.

If the annular tube reduced unit is to be employed as a consumable electrode and a compactible material comprising powdered or chip zirconium is to be employed, another metal such as molybdenum will be employed for an inner and outer sheathing. The molybdenum may be desired for an alloying ingredient with zirconium.

Intricately shaped tubes may be formed by the rocking roll tube reducing process. A suitable set of dies and a cooperating mandrel may be designed for the proper tube shape desired. The annular space between the concentric cylindrical tube members is filled with a low melting temperature compactible material such as sodium chloride. The annular composite members are rocking roll tube reduced to the desired shape and the low melting material melted out upon subsequent heating.

The following examples are illustrative of the teachings of the invention.

Example I

A stainless steel cylinder 78 inches long and 2.5 inches in diameter, of a wall thickness of 0.035 inch was sealed at one end thereof and fitted with a central stainless steel tube of 1.73 inches outer diameter and a wall thickness of 0.035 inch. The inner annular space was filled with powdered sodium chloride. An end plug was welded to the rear end of the stainless steel cylinder. The resulting unit was rocking roll reduced using the apparatus shown in FIG. 1 to effect a 30% reduction of area of the annulus between the tubes and simultaneously reduce the wall thickness of the tubes. The final dimensions of this assembly were 1.6 inch outer diameter, 1.058 inch inner diameter, and 143 inches in length, and the wall thickness of each tube was 0.029 inch.

The annular composite elongated member was then heated sufficiently to melt the sodium chloride. The tubes were then removed from each other and cleaned. They were clean and free of any surface blemishes or flaws.

Example II

An annular nuclear fuel element was prepared in the the manner of Example I except that uranium dioxide was substituted for the sodium chloride.

The element was tube reduced to yield a 30% reduction in the annulus between the tubes. After this initial pass the uranium dioxide had been compacted to a dense highly uniform structure of 85–88% of theoretical density.

Without any benefit of stress relieving a second pass was made in the tube reducing apparatus. The annulus between the tubes was now 42% of the original area. The uranium dioxide was now compacted to 91.6% of its theoretical density. This is an excellent density value. The surfaces of the tube were relatively unblemished and showed no structural flaws upon examination. Hammer or rotary swaging would have created a rough surface and probable sheath defects without attaining the density for the uranium dioxide.

Example III

An annular elongated composite member was prepared in the manner of Example I, the stainless steel tube having an outer diameter of 1.12 inches and the central tube having an inner diameter of 0.81 inch. The inner annular space was filled with powdered magnesium oxide. The unit was rocking roll reduced so that the outer diameter of the stainless steel tube as reduced was 0.75 inch. The density of the magnesium oxide exceeded 70%, and it is known to be extremely difficult to produce annular magnesium oxide bodies of density as high as this.

Example IV

A unit was prepared in the manner of Example I, the outer diameter of the outer stainless steel tube being 1.187 inches and an inner diameter of 1.122 inches. A stainless steel rod 1.187 OD was fitted in the stainless steel cylinder and the inner annular space was filled with powdered iron sold under the trade name of RZ–Fe. The unit was tube reduced so that the outer diameter as reduced was 0.75 inch.

The resulting density of this powdered iron was 88% of theoretical density. This is an excellent density value.

Example V

An annular elongated composite member was prepared in the manner of Example I. The outer diameter of the outer stainless steel tube was 1.190 inches. The inner diameter of the stainless steel tube was 0.810 inch. The annular space between the two stainless steel tubes was filled with an iron powder sold under the trade name of RZ–Fe.

Following a rocking roll tube reducing process of the annular composite to an outside diameter of 0.750 inch, the density of the RZ–Fe iron powder was found to be 93% of theoretical density. This is an excellent density value, particularly since RZ–Fe iron powder is considered to be capable of hot compaction only.

Example VI

An annular nuclear fuel element was prepared in the manner of Example I, the stainless steel tube having an outer diameter of 1.19 inches and the central tube having an inner diameter of 0.81 inch. The inner annular space was filled with powdered uranium dioxide. The element was tube reduced so that the outer diameter of the stainless steel tube as reduced was 0.75 inch. The density of the uranium dioxide exceeded 88%.

Example VII

An annular elongated composite member is prepared as in Example II, using aluminum tubing, the space between the tubes being filled with n-type lead telluride, and, after tube reducing the resulting highly dense, compacted, elongated body is machined to cut off the sealed ends.

The remainder of the tube is machined into short cylindrical pellets in each of which the compacted lead telluride is joined to the inner and outer aluminum cylindrical sections.

A similar tube reduced annular elongated composite member is prepared substituting p-type germanium telluride for the lead telluride, and similar short cylindrical pellets are prepared. A series of alternate germanium telluride and lead telluride pellets are joined into a long tubular structure whereby the inner tubes of every other pair of adjacent pellets are electrically joined to each other, while the outer tubes of each such joined pair are electrically connected to the adjacent pair, thereby producing a thermoelectric device. Passing a hot fluid such as water through the inner tubes and cooling the outer tubes of the device will cause an electrical potential to be produced between the extreme ends of the device.

Similarly, other units may be prepared and rocking roll tube reduced as described by substituting in the above example aluminum, zirconium, copper or iron for stainless steel, and other compactible materials may be employed for the several compactible materials listed. Slight modifications may be followed in the initial unit to compensate for the different metal and design considerations. In particular, thermoelectric materials may be substituted for the various materials described in the examples.

A plurality of concentric annular spaces may be present in each by nesting three or more tubes into a single unit, the several annular spaces being filled with different compactible materials. Thus, three tubes of aluminum, for instance, of successively larger diameter are disposed concentrically to provide two annular spaces and one space is filled with zinc antimonide and the other space is filled with germanium bismuth telluride. The resulting assembly is rocking roll reduced to provide a composite body from which thermoelectric pellets may be severed in which zinc antimonide is in series with the germanium bismuth telluride. More than three tubes may be employed in a similar manner.

The tubes may be coated with a layer of a material so as to improve bonding with the compacted material. Thus, iron plating on copper tubes is desirable to reduce any reaction from taking place as compared to the reaction of copper in contact with lead telluride during use of the thermoelectric devices so produced.

While the invention has been described with reference to particular embodiments and examples, it will be understood, of course, that modifications, substitutions and the like may be made therein without departing from its scope.

We claim as our invention:

1. A process for producing an annular composite, elongated, cylindrical unit, the steps comprising disposing a compactible ceramic-type material between at least two concentric cylindrical metal members, the metal being selected from the group consisting of zirconium, zirconium base alloys and stainless steel, the material filling the space therebetween, and rocking roll processing the unit to effect a substantial reduction of up to the order of 70% to provide a dense, highly compacted, uniform body of the ceramic-type material in firm and intimate contact with the walls of the metal members while simultaneously reducing the wall thickness of each of the concentric cylindrical metal members.

2. A process for producing a composite, elongated, cylindrical unit, the steps comprising disposing a compactible material within a hollow cylindrical metal member, the material filling the space therein, the ends of the metal member being sealed to provide a closure for the compactible material, compacting the material therein and rocking roll processing the unit to effect a substantial reduction to provide a dense, highly compacted, uniform body of material in firm and intimate contact with the walls of the metal member.

3. A process for producing an annular composite, elongated, cylindrical unit, the steps comprising disposing a compactible material between at least two concentric cylindrical metal members, the material filling the space therebetween, the ends of the metal members being sealed to provide a closure for the compactible material, and rocking roll processing the unit to provide a dense highly compacted, uniform body of material in firm and intimate contact with the walls of the metal members while simultaneously reducing the wall thickness of each of the concentric metal members.

4. The process of claim 3 wherein the compactible material is a semiconductor material.

5. A process for producing a composite, elongated, cylindrical unit, the steps comprising disposing a compactible material between a rod member and a concentric hollow cylindrical metal member, the material filling the space therebetween, the ends of the metal members being sealed to provide a closure for the compactible material, and rocking roll processing the unit to provide a dense highly compacted, uniform body of material in firm and intimate contact with the walls of the metal members.

6. A process for producing an annular elongated nuclear fuel element, the steps comprising disposing a solid compactible fissionable material between at least two concentric cylindrical metal members of a metal selected from the group consisting of zirconium, zirconium base alloys and stainless steel, the fissionable material filling the space therebetween, the ends of the metal members being sealed to provide a closure for the fissionable material, and rocking roll processing the element without any intermediate annealing to simultaneously provide a dense highly compacted, uniform body of fissionable material in firm and intimate contact with the walls of the metal members and a substantial reduction of up to the order of 70% in the wall thickness of each of the metallic members.

7. The process of claim 6 in which the compactible fissionable fuel material is at least one material selected from a group consisting of arc fused uranium dioxide, ceramic uranium dioxide, uranium nitride, uranium carbide, and a mixture of stainless steel and uranium dioxide.

8. A process for producing an annular thermoelectric element, the steps comprising disposing a powdered compactible thermoelectric material between at least two concentric cylindrical metal members, the thermoelectric material filling the space therebetween, the ends of the metal members being sealed to provide a closure for the thermoelectric material, and rocking roll processing the member to provide a highly compacted, uniform dense body of thermoelectric material in firm and intimate contact with the walls of the metal members.

References Cited

UNITED STATES PATENTS

| | | | |
|---|---|---|---|
| 2,864,758 | 12/1958 | Shackelford | 176—83 |
| 2,956,000 | 10/1960 | Kendall et al. | 176—83 |
| 3,042,594 | 7/1962 | Hauth | 29—420 |
| 3,049,799 | 8/1962 | Breining et al. | 29—420 |
| 798,055 | 8/1905 | Nicholson | 29—474.3 |
| 2,703,999 | 3/1955 | Gille | 72—208 |
| 2,983,660 | 5/1961 | Loeb et al. | 29—422 X |
| 3,004,907 | 10/1961 | Precht et al. | 176—82 |
| 3,015,615 | 1/1962 | Precht et al. | 29—400 |
| 3,109,797 | 11/1963 | Maxwell | 176—83 X |
| 3,124,875 | 3/1964 | Takahashi et al. | 176—83 X |

CARL D. QUARFORTH, *Primary Examiner.*

M. J. SCOLNICK, *Assistant Examiner.*